(12) United States Patent
Möhle et al.

(10) Patent No.: US 8,497,614 B2
(45) Date of Patent: Jul. 30, 2013

(54) WINDING PLAN FOR A SEGMENTED STATOR OF A DYNAMO-ELECTRIC MACHINE

(75) Inventors: Axel Möhle, Berlin (DE); Rüdiger Schäfer, Berlin (DE)

(73) Assignee: Siemens Aktiengesellschaft, München (DE)

( * ) Notice: Subject to any disclaimer, the term of this patent is extended or adjusted under 35 U.S.C. 154(b) by 390 days.

(21) Appl. No.: 12/834,421

(22) Filed: Jul. 12, 2010

(65) Prior Publication Data

US 2011/0163550 A1 Jul. 7, 2011

(30) Foreign Application Priority Data

Jul. 13, 2009 (DE) .......................... 10 2009 032 880

(51) Int. Cl.
*H02K 3/00* (2006.01)
*H02K 3/12* (2006.01)
*H02K 3/38* (2006.01)

(52) U.S. Cl.
USPC ........... 310/179; 310/180; 310/200; 310/204; 310/208

(58) Field of Classification Search
USPC .......................... 310/179, 180, 200, 204, 208
IPC ................................ H02K 3/00,3/12, 3/28, 3/38
See application file for complete search history.

(56) References Cited

U.S. PATENT DOCUMENTS

| | | | | |
|---|---|---|---|---|
| 1,799,021 A * | 3/1931 | Jessel et al. | .................. | 310/208 |
| 4,103,213 A * | 7/1978 | Landgraf | ..................... | 318/775 |
| 5,811,905 A * | 9/1998 | Tang | ............................ | 310/179 |
| 5,886,444 A * | 3/1999 | Enomoto et al. | ............. | 310/208 |
| 6,429,554 B1 * | 8/2002 | Albrich et al. | ............. | 310/68 R |
| 2004/0178691 A1 * | 9/2004 | Sanada et al. | ................ | 310/181 |
| 2007/0096587 A1 * | 5/2007 | Ionel et al. | .................... | 310/218 |
| 2008/0272669 A1 | 11/2008 | Möhle et al. | | |
| 2008/0309189 A1 * | 12/2008 | Pabst et al. | .................... | 310/218 |
| 2009/0021093 A1 * | 1/2009 | McNamara | .................... | 310/89 |
| 2009/0091210 A1 | 4/2009 | Möhle et al. | | |

FOREIGN PATENT DOCUMENTS

| | | |
|---|---|---|
| DE | 102007042338 A1 | 3/2009 |
| FR | 2208234 A1 | 6/1974 |
| WO | WO 2006032969 A2 | 3/2006 |
| WO | WO2008014584 * | 2/2008 |

* cited by examiner

*Primary Examiner* — Tran Nguyen
*Assistant Examiner* — Terrance Kenerly
(74) *Attorney, Agent, or Firm* — Henry M. Feiereisen LLC

(57) ABSTRACT

A segmented annular stator for a dynamo-electric machine is disclosed which simplifies transport and assembly of the machine. The segment has a cross section essentially shaped as a circular arc and includes a first and a second segment boundary configured for attachment to an additional segment, a corresponding coil associated with each phase of a three-phase system, a first conductor, and a second conductor. The first conductor is connected to the second conductor via an end connection in an area of end windings, such that a first coil associated with a first phase surrounds second and third coils associated with second and third phases of the three-phase system.

10 Claims, 4 Drawing Sheets

WINDING PLAN FOR A SEGMENTED STATOR OF A DYNAMO-ELECTRIC MACHINE

CROSS-REFERENCES TO RELATED APPLICATIONS

This application claims the priority of German Patent Application, Serial No. 10 2009 032 880.7, filed Jul. 13, 2009, pursuant to 35 U.S.C. 119(a)-(d), the content of which is incorporated herein by reference in its entirety as if fully set forth herein.

BACKGROUND OF THE INVENTION

The invention relates to a segment for an annular stator of a dynamo-electric machine. The invention is particularly applicable to very large electrical machines. Generators for wind power installations, tidal power stations, ring motors or drives for construction machines such as mechanical diggers may be mentioned as examples of machines such as these.

The following discussion of related art is provided to assist the reader in understanding the advantages of the invention, and is not to be construed as an admission that the discussed related art is prior art to the claimed invention.

Energy recovery from regenerative energy sources is becoming evermore important. Correspondingly, the components used for energy conversion are subject to evermore stringent requirements. One consequence of this is that, for example, generators for wind power installations require an ever greater physical volume.

As the rating class rises, wind energy installations without gearboxes are becoming competitive with installations in which a mechanical gearbox is connected between the rotor blades that are driven by the wind and a synchronous generator. The main advantage of a design such as this without a gearbox is that the design is considerably simpler than that of wind power installations with a gearbox. The lack of the gearbox means that fewer rotating machine components are required. This results in less maintenance effort and increased installation availability.

In particular, very large wind power installations generally operate at comparatively low rotation speeds. In an embodiment without a gearbox, installations such as these must therefore be equipped with very large and heavy generators. In this case, the diameter of these machines easily exceeds 4 or 5 m.

As the size of the wind power generators which the higher ratings of these installations necessarily result in become larger, their assembly becomes ever more difficult. Turbines without gearboxes for wind-power or else tidal power stations also result in stringent requirements, however, for transport and logistics.

Generators for wind power installations without gearboxes frequently have an annular rotor with a hollow shaft. One such electrical machine is disclosed, for example, in WO 2006/032969 A2. This document discloses a stator which is subdivided into a plurality of segments in the circumferential apparatus. Each stator segment has a dovetail profile which engages in a window in a stator ring. Each of these sectors can therefore be pulled out in the axial direction without having to remove the entire stator.

It would therefore be desirable and advantageous to provide an improved Winding plan for a segmented stator of a dynamo-electric machine to obviate prior art shortcomings and to make it easier to transport and assemble large electrical machines.

SUMMARY OF THE INVENTION

According to one aspect of the present invention, a segment for an annular stator of a dynamo-electric machine having a cross-section essentially in form of a circular arc includes
- a first and a second segment boundary configured for attachment to an additional segment,
- at least one coil associated with each phase of a three-phase system,
- at least one first conductor, and
- at least one second conductor,
  - wherein the at least one first conductor is connected to the at least one second conductor via an end connection in an area of end windings, such that a first coil associated with a first phase surrounds second and third coils associated with second and third phases of the three-phase system.

The segments of the stator according to the invention are designed such that there is no need for the segments to be electrically connected to one another. A connection such as this would be highly complex. In order to provide it, special coils would have to be manufactured, which would also have to have a certain amount of flexibility in the coil nose and would then have to be inserted retrospectively into the stator slots in order to electrically bridge the segment boundaries. These coils would then also have to be subsequently insulated manually after the actual process of impregnation of the winding.

An alternative solution for electrical connection of the segments of the stator would be for each of the coils which are arranged on the segment boundaries to be designed only as half-coils, and for these to be soldered together after the construction of the stator. However, subsequent insulation is also required in this case. The disadvantageous methods mentioned above have the common feature that subsequent non-destructive separation of the segments, for example for maintenance or repair purposes, is no longer possible.

The invention is based on the discovery that the problematic electrical connections described above between the individual segments of the stator can be eliminated if all the coils in a segment are closed within that segment. This means that the coils which are arranged at the segment boundaries are also closed within the segment. This can be done by connecting the first conductor, which is arranged at the first segment boundary, to the second conductor, which is arranged at the second segment boundary, via a lengthened end connection on the end winding. The first conductor therefore need not be connected to an additional conductor of an adjacent additional segment across the left-hand segment boundary. In fact, the second conductor, which is located on the right-hand segment boundary, is used as the return conductor for the first conductor.

The coil which is created by the connection of the first and second conductors surrounds the at least two remaining coils. Overall, the segment according to the invention therefore comprises at least three coils. The segment can be impregnated as a complete, closed unit. There is no need for subsequent coil connections across the segment boundaries. The segments according to the invention created in this way can be fitted as closed functional elements and, for example, can be removed for maintenance or repair purposes. In this case, a single segment can be stocked as a spare part, instead of a complete stator.

The electrical machine according to the invention may be both a generator and a motor. The segmentation of the stator according to the invention is advantageously independent, particularly in the case of very large bore diameters of whether the machine is intended for use primarily as a motor or as a generator.

Advantageous embodiments of the invention may include one or more of the following features.

In one advantageous embodiment of the invention, a three-phase current can be passed through the coils independently of additional coils of the additional segments, in order to produce a first pole pair of a rotating field.

The segment may, of course, also have even more coils, thus allowing it to be used to produce a greater number of pole pairs than one. For example, in one advantageous embodiment of the invention, the segment for each phase of the three-phase system has at least one second coil, which is closed within the segment in order to produce a second pole pair, through which the three-phase current can be passed independently of additional coils of the additional segments in order to produce a second pole pair of the rotating field.

The windings which are expediently in the form of a circumferential winding, are in one advantageous embodiment of the invention designed such that the coils are arranged as a tier winding, such that the conductors of the three coils of a pole pair are superimposed in the area of the end windings.

In an additional advantageous embodiment of the invention, a segment such as this can in this case be produced easily by the coils being in the form of a single-layer winding.

Alternatively, however, a embodiment of the invention is, of course, feasible in which the coils are in the form of a two-layer winding.

Particularly in the case of very large dynamo-electric machines, a considerable transport advantage is achieved in that the closed annular shape of the stator can be interrupted by separating the segments from one another. In the case of a embodiment such as this, there is, for example, no longer any need to transport the complete hollow cylinder, which forms the complete stator by road. The individual segments when disassembled occupy considerably less volume than in the assembled state.

In another advantageous embodiment of the invention, a dynamo-electric machine having at least two segments of one of the embodiments described above is in the form of a directly driven generator for a wind power installation or a tidal power station. Generators such as these require a large physical volume in order to allow them to produce a high electrical power, because of the low rotation speeds which can be produced by the drive forces that are used here. It is likewise advantageous to use a dynamo-electric machine with a segmented stator corresponding to one embodiment of the invention in numerous other fields of operation, which require a high torque and therefore a large machine diameter.

A wind power installation having a dynamo-electric machine whose stator is manufactured from individual segments in the form of partial rings according to one of the embodiments described above, can be assembled very easily at the location where it will later be used. The individual segments of the stator can be transported very much better to the installation location, for example by road, than a complete dynamo-electric machine.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
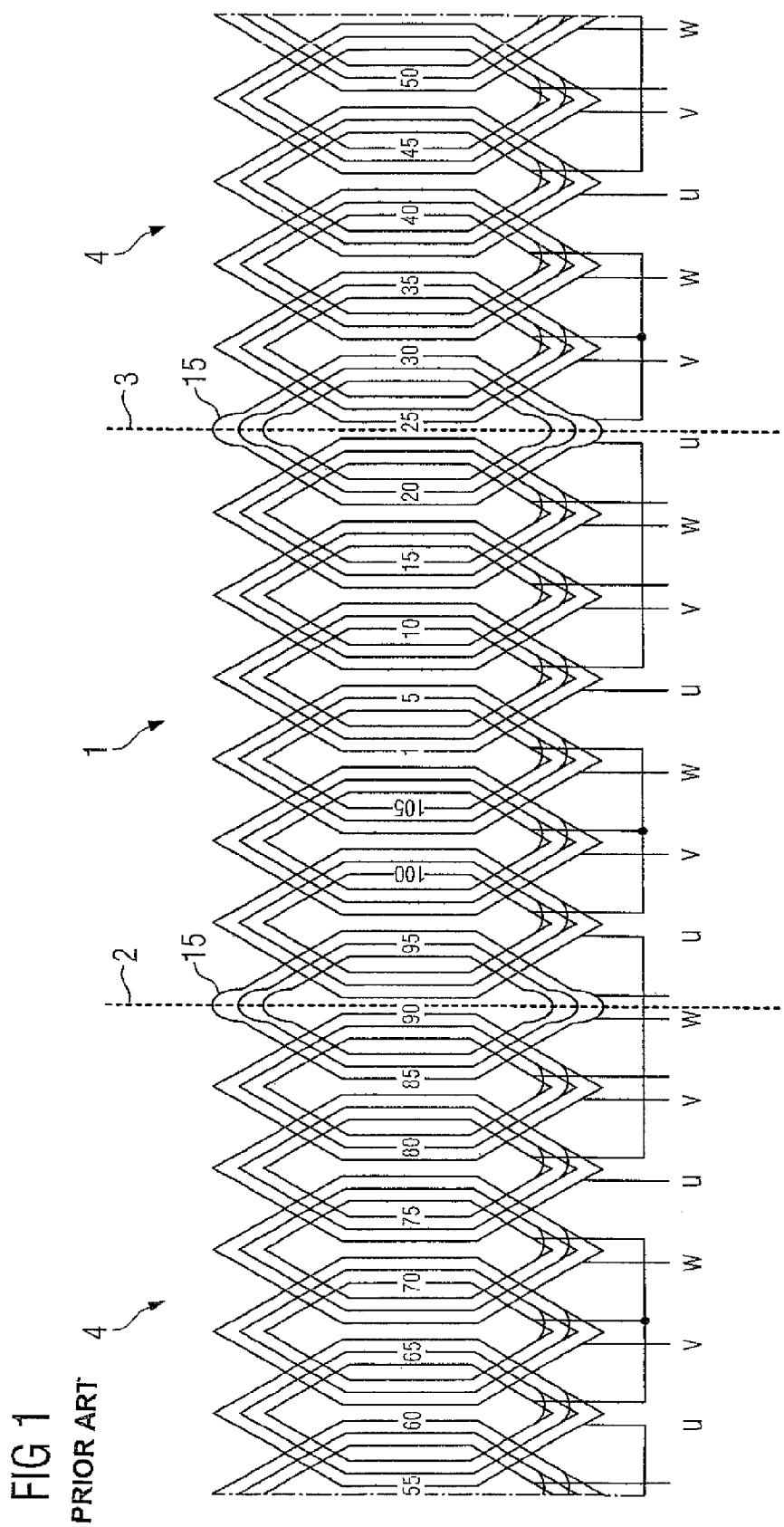
FIG. 1 shows a winding plan for a conventional embodiment of a segment of a stator.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a winding plan for a conventional embodiment of a segment 1 of a stator. The illustrated winding plan is intended for a very large dynamo-electric machine whose stator is segmented, in order to reduce its transport volume to such an extent that the stator can be transported by road to a subsequent installation location, where it can be assembled. One typical example of a dynamo-electric machine such as this is a wind power generator, which is in the form of a hollow-shaft generator.

A segment 1, which is illustrated in the center of FIG. 1, is connected to two additional segments 4 during assembly of the wind power generator. The additional segments 4 are connected to the segment 1 at a first and a second segment boundary 2, 3. The segment 1 and the additional segments 4 are largely physically identical. Each of the segments is designed with coils which allow a rotating field to be produced. However, not all the coils within the segment 1 are closed. At the first segment boundary 2 and at the second segment boundary 3 there is in each case a half-coil which must be electrically connected to a half-coil in one of the additional segments 4. In order to make this possible, after the segment 1 has been joined to the additional segments 4, special connecting coils 15 are used, which electrically connect said half-coils across the segment boundaries 2, 3. These also have to have a certain amount of flexibility in the coil nose. The connecting coils 15 can therefore not also be insulated during the course of the impregnation process of the winding, but must be insulated manually, subsequently.

Figure 2:
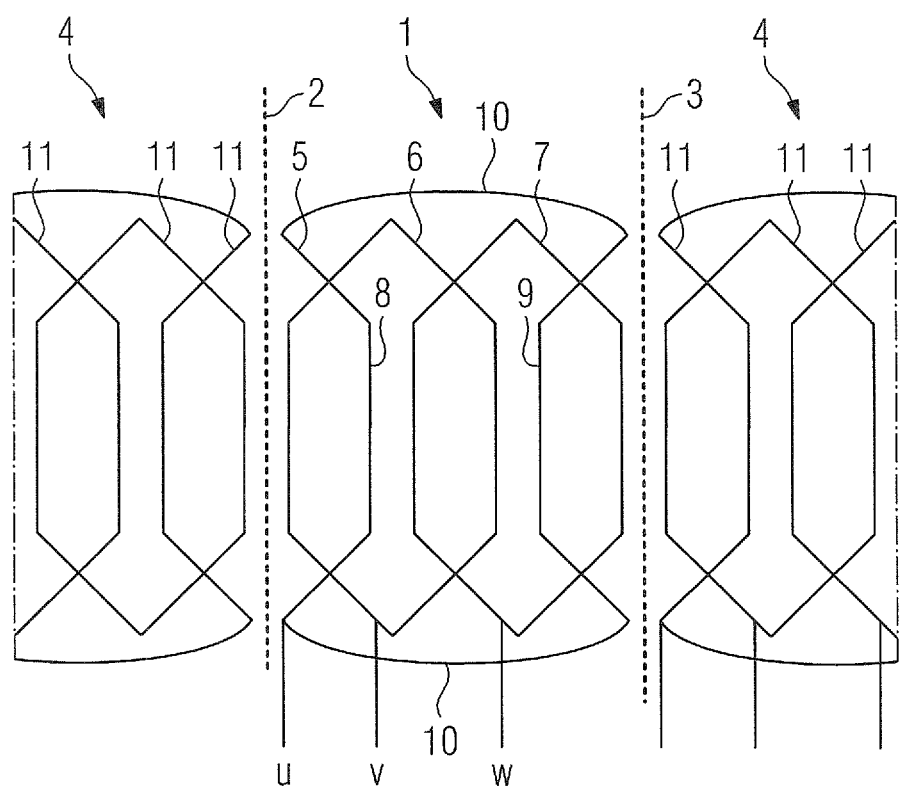
FIG. 2 shows a winding plan for a segment according to a first refinement of the invention.

FIG. 2 shows a winding plan for a segment 1 according to a first refinement of the invention. Once again, it is assumed here that the winding plan or the segment 1 is intended for a hollow-shaft generator of a wind power installation. The segment 1 shown in the center is mechanically connected to additional segments 4, during construction of the wind power generator, at a first segment boundary 2 and at a second segment boundary 3. When N segments are provided for the hollow-shaft generator, then the cross-sectional area of each of the segments 1 covers a circular arc with an angle of 360°/N.

Each of the segments 1 comprises three coils 5, 6, 7—in each case one coil 5, 6, 7 for each phase of a three-phase system. A pole pair can thus be provided with each segment 1 for the dynamo-electric machine. Two of these coils 5, 6, 7 are closed in the conventional manner within the segment 1. A third coil 5 is formed by connecting a first conductor 8, which is arranged in the vicinity of the first segment boundary 2, via an end connection 10 to a second conductor 9 which is arranged in the vicinity of the second segment boundary 3. This results in the coil 5 formed in this way surrounding two conventionally closed coils 6, 7. The magnetic response of a segment 1 such as this corresponds essentially to a magnetic response as achieved with a conventional winding as shown in FIG. 1. However, no connecting elements are required to electrically connect the coils 5, 6, 7 to additional coils 11 in the additional segments 4. A hollow-shaft generator such as this can be assembled considerably more easily, since current can be passed autonomously through each segment 1 and there is no need for an electrical connection, or the retrospective insulation associated with this across the segment boundaries 2, 3. This refinement of the hollow-shaft generator also considerably simplifies maintenance and repair tasks. If a defect occurs on a segment 1, then this can be replaced without having to disconnect the connecting elements, of whatever type for this purpose which cross the segment boundaries 2, 3. Individual segments 1 can be stored as spare parts, thus allowing replacement in the event of a defect promptly. Shut-down times are considerably reduced in this way.

Figure 3:
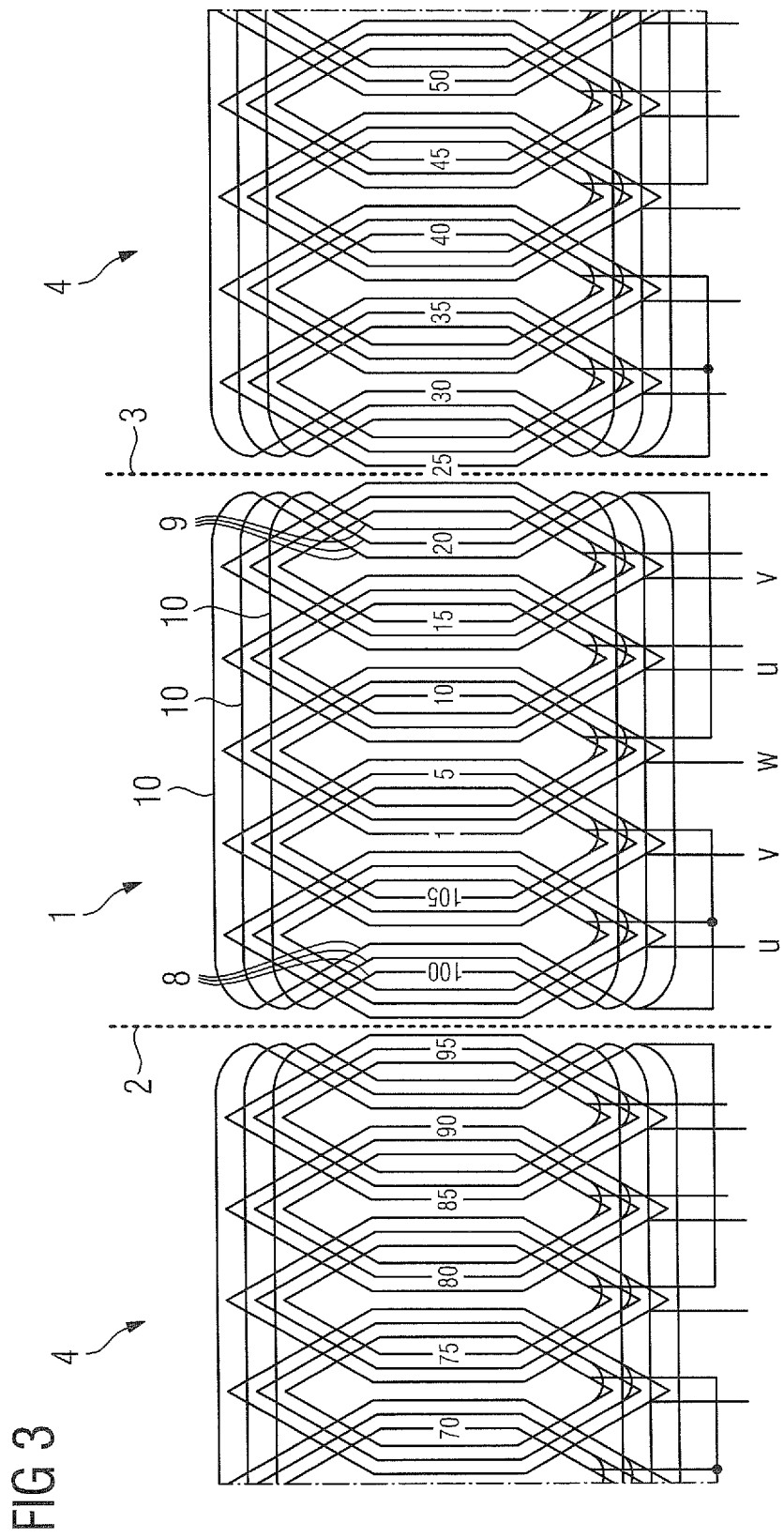
FIG. 3 shows a winding plan for a segment according to a second refinement of the invention.

FIG. 3 shows a winding plan for a segment 1 according to a second refinement of the invention. In contrast to the first refinement as shown in FIG. 2, there are three slots per pole and winding section in this case. This resulting from the fact that a coil group comprising three coils arranged concentrically with respect to one another is provided for each phase. The winding of these coils is designed analogously to the winding illustrated in FIG. 2. This means that, in this case as well, conductors 8, 9 which are arranged at the segment boundaries 2, 3 are connected to one another via end connections 10. The advantages which result from this have already been mentioned in the description in relation to FIG. 2.

Figure 4:
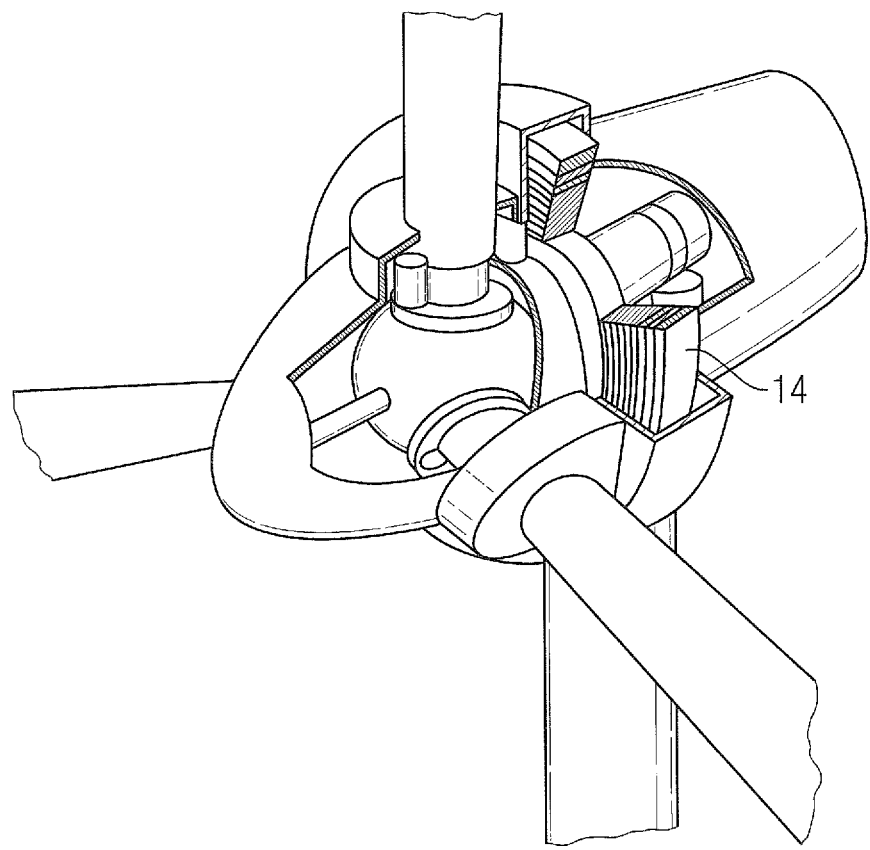
FIG. 4 shows a wind power installation having a dynamo-electric machine which has a segmented stator.

FIG. 4 shows a wind power installation having a dynamo-electric machine which has a segmented stator. The electrical machine 14 is in the form of a hollow-shaft generator. In this case, there is no gearbox, as a result of which the stator of the dynamo-electric machine 14 has a very large diameter. The stator is segmented, such that it can be assembled by joining the individual segments together at the location where it will subsequently be used.

The hollow-shaft generator can be assembled comparatively easily because of the advantageous configuration of these segments, in the form of an embodiment according to the present invention. There is no need for the individual segments to be electrically connected to one another in order pass current through the coils of the segments. This considerably simplifies the assembly process, since electrical segment connections which are formed subsequently at the building site between the coils of the segments would have to be insulated, which is also complex. In contrast, the generator described here consists of individual segments which are completely electrically functional and do not require this connection.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A segment for an annular stator of a dynamo-electric machine having a cross-section essentially in form of a circular arc, the segment comprising:
   a first and a second segment boundary configured for attachment to an additional segment,
   at least one coil associated with each phase of a three-phase system, wherein first and a second coils of a first and a second phase of the three-phase system are continuously concentrically wound and a third coil of a third phase of the three-phase system is constructed from two half-coils which are wound and are each arranged at a respective one of the first and a second segment boundaries, with a first half-coil having
   at least one first conductor, and a second half-coil having at least one second conductor,
   wherein an end winding of the at least one first conductor of a first half-coil is connected to an end winding of the at least one second conductor of a second half-coil via an end connection within the segment, such that current flow through the coils of a segment is independent of current flow through coils of an additional segment.

2. The segment of claim 1, wherein the coils of a segment produce a first pole of a pole pair of a rotating field.

3. The segment of claim 2, wherein the segment comprises at least one second coil for each phase of the three-phase system, which is closed within the segment and produces a second pole of a pole pair of a rotating field.

4. The segment of claim 1, wherein the first, second and third coils are arranged as a tier winding, such that the conductors of the first, second and third coils of a pole of a pole pair are superpositioned in the area of the end windings.

5. The segment of claim 1, wherein the first, second and third coils are in form of a single-layer winding.

6. The segment of claim 1, wherein the first, second and third coils are in form of a two-layer winding.

7. The segment of claim 1, wherein the adjacent segments of the annular stator are separable from one another.

8. A dynamo-electric machine having an annular stator comprised of at least two segments having a cross-section essentially in form of a circular arc, each of the at least two segments comprising:
   a first and a second segment boundary configured for attachment to another of the at least two segments,
   at least one coil associated with each phase of a three-phase system,
   at least one coil associated with each phase of a three-phase system, wherein first and a second coils of a first and a second phase of the three-phase system are continuously concentrically wound and a third coil of a third phase of the three-phase system is constructed from two half-coils which are wound and are each arranged at a respective one of the first and a second segment boundaries, with a first half-coil having
   at least one first conductor, and a second half-coil having at least one second conductor,
   wherein an end winding of the at least one first conductor of a first half-coil is connected to an end winding of the at least one second conductor of a second half-coil via an end connection within the segment, such that current flow through the coils of a segment is independent of current flow through coils of an additional segment.

9. The dynamo-electric machine of claim 8, wherein the dynamo-electric machine is in the form of a directly driven generator for a wind power installation or a tidal power station.

10. A wind power installation having a dynamo-electric machine having an annular stator comprised of at least two segments having a cross-section essentially in form of a circular arc, each of the at least two segments comprising:
- a first and a second segment boundary configured for attachment to another of the at least two segments,
- at least one coil associated with each phase of a three-phase system,
- at least one coil associated with each phase of a three-phase system, wherein first and a second coils of a first and a second phase of the three-phase system are continuously concentrically wound and a third coil of a third phase of the three-phase system is constructed from two half-coils which are wound and are each arranged at a respective one of the first and a second segment boundaries, with a first half-coil having
- at least one first conductor, and a second half-coil having at least one second conductor,
- wherein an end winding of the at least one first conductor of a first half-coil is connected to an end winding of the at least one second conductor of a second half-coil via an end connection within the segment, such that current flow through the coils of a segment is independent of current flow through coils of an additional segment.

* * * * *